United States Patent [19]
Berger et al.

[11] 4,165,375
[45] Aug. 21, 1979

[54] LOW-FOAMING DISINFECTING AGENTS BASED ON QUATERNARY AMMONIUM COMPOUNDS

[75] Inventors: Hans-Jürgen Berger, Kalletal; Ferdinand Koch; Rolf Scharf, both of Düsseldorf; Hans-Joachim Schlüssler, Haan, all of Fed. Rep. of Germany

[73] Assignee: Henkel Kommanditgesellschaft auf Aktien, Düsseldorf-Holthausen, Fed. Rep. of Germany

[21] Appl. No.: 702,230

[22] Filed: Jul. 2, 1976

[30] Foreign Application Priority Data

Jul. 9, 1975 [DE] Fed. Rep. of Germany ....... 2530584

[51] Int. Cl.[2] ........................ A01N 9/00; A01N 9/20; A01N 9/24

[52] U.S. Cl. .................................. 424/263; 252/321; 252/358; 424/312; 424/329

[58] Field of Search ...................... 424/263, 329, 312; 252/321, 358

[56] References Cited

U.S. PATENT DOCUMENTS

| | | | |
|---|---|---|---|
| 2,349,585 | 5/1944 | Bond et al. | 252/8.5 |
| 3,574,821 | 4/1971 | Pfirrmann et al. | 424/45 |

FOREIGN PATENT DOCUMENTS

| | | | |
|---|---|---|---|
| 1578111 | 8/1969 | France | 424/329 |
| 795814 | 5/1958 | United Kingdom . | |

*Primary Examiner*—Allen J. Robinson
*Attorney, Agent, or Firm*—Hammond & Littell

[57] ABSTRACT

A low-foaming disinfecting agent for spraying or sprinkling applications comprising a quaternary ammonium compound and a foam-inhibiting amount of at least one lower alkyl laurate.

8 Claims, No Drawings

LOW-FOAMING DISINFECTING AGENTS BASED ON QUATERNARY AMMONIUM COMPOUNDS

RELATED ART

Disinfecting agents based on quaternary ammonium compounds have proved to be satisfactory for disinfecting and, if required, cleaning metal surfaces in the food industry, particularly in industries which manufacture beverages.

The disadvantage of these products resides in the considerable formation of foam when the solid surfaces are coated by means of low-pressure or high-pressure pumps by way of spray devices or when these solid surfaces are packed in a container having spray heads rigidly fitted into the containers. The foaming of these products containing quaternary ammonium compound causes the pumps of the spray device to draw in air or, when disinfection is controlled fully automatically, prevents accurate phase separation before passing by the conductivity-measuring electrodes fitted in the cleaning, disinfecting and rinsing circuit.

OBJECTS OF THE INVENTION

An object of the present invention is to develop disinfecting agents for spraying and sprinkling processes, based on quaternary ammonium compounds and containing an effective foam inhibitor.

Another object of the present invention is the development of a low-foaming disinfecting agent for spraying or sprinkling applications consisting essentially of a disinfecting amount of a quaternary compound, from 0.1% to 20% by weight, based on the solids weight of said agent of at least one lower alkyl laurate, as a foam inhibitor, and from 0 to 55% by weight, based on the solids weight of said agent, of a sequestering compound counteracting the hardness components of water.

A further object of the present invention is the development, in the process of disinfecting solid surfaces by spraying or sprinkling an aqueous solution thereon containing a disinfecting amount of a quaternary ammonium disinfecting agent, of the improvement of incorporating a foam-inhibiting amount of a lower alkyl laurate in said solution.

These and other objects of the present invention will become more apparent as the description thereof proceeds.

DESCRIPTION OF THE INVENTION

We have now discovered that disinfecting agents for application by spraying or sprinkling processes, based on quaternary ammonium compounds, can be substantially improved when the disinfecting agents have a content of esters of lauric acid with lower alkanols, as foam inhibitors. Suitable lower alkanols are those having from 1 to 7 carbon atoms, preferably 1 to 4 carbon atoms, such as methanol, ethanol, propanol, isopropanol and butanol. Preferably, isopropyl laurate and ethyl laurate have proved to be most suitable.

More particularly, therefore, the present invention relates to a low-foaming disinfecting agent for spraying or sprinkling applications consisting essentially of a disinfecting amount of a quaternary ammonium compound, from 0.1% to 20% by weight, based on the solids weight of said agent of at least one lower alkyl laurate, as a foam inhibitor, and from 0 to 55% by weight, based on the solids weight of said agent, of a sequestering compound counteracting the hardness components of water; as well as the improvement in the process of disinfecting solids by the spraying or sprinkling process which consists in employing a foam-inhibiting amount of a lower alkyl laurate.

A minimum volume of foam is obtained with these additives when the corresponding products are sprayed onto rigid surfaces or tested in suitable foam-producing apparatus.

As indicated, the amounts of the lower alkyl laurates employed are from 0.1% to 20% by weight, preferably from 0.1% to 10% by weight, based on the solids weight in the disinfecting agent composition. This is to distinguish from liquid additives often employed in disinfecting agent compositions such as water, alcohols, and other solvents, as well as liquid organic and inorganic acids. The amount employed within the above range depends upon the foaming behavior of the disinfecting agent composition.

Suitable quaternary ammonium compounds employed as disinfecting agents have the general formula:

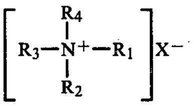 or (I)

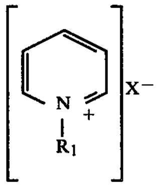 (II)

in which $R_1$ represents an organic radical having 8 to 20 carbon atoms, optionally containing heteroatoms, $R_2$ and $R_3$ represent alkyl having 1 to 3 carbon atoms or alkylol having 2 to 3 carbon atoms in each case, $R_4$ represents an alkyl having 1 to 12 carbon atoms or an aralkyl group, preferably a phenyl-lower alkyl group, which is optionally substituted, and X represents an anion.

Preferably, the organic radical $R_1$ comprises an aliphatic radical in the form of an alkyl or an alkyl interrupted by heteroatoms such as oxygen or nitrogen, or an aliphatic-aromatic radical. In the last-mentioned compound, the aliphatic radical on the quaternary nitrogen atom is generally interrupted by heteroatoms such as oxygen or nitrogen, or by a phenoxy group. If the radical $R_4$ represents an aralkyl group, the aromatic ring can be substituted particularly by chlorine, bromine and lower alkyl groups having 1 to 4 carbon atoms.

Particularly suitable quanternary ammonium compounds are:

diethyl-dodecyl-benzyl-ammonium chloride
dimethyl-octadecyl-dimethylbenzyl-ammonium chloride
dimethyl-didecyl-ammonium chloride
dimethyl-didodecyl-ammonium chloride
trimethyl-tetradecyl-ammonium chloride
benzyl-dimethyl-alkyl-($C_{12}$–$C_{18}$)-ammonium chloride
dichlorobenzyl-dimethyl-dodecyl-ammonium chloride
cetylpyridinium chloride
cetylpyridinium bromide cetyl-trimethyl-ammonium chloride
laurylpyridinium chloride
laurylpyridinium bisulfate
benzyl-dodecyl-di-(β-hydroxyethyl)-ammonium chloride
dodecylbenzyl-trimethyl-ammonium chloride
n-alkyl-dimethyl-benzyl-ammonium chloride (alkyl radical: 40% $C_{12}$, 50% $C_{14}$, 10% $C_{16}$)
lauryl-dimethyl-ethyl-ammonium ethylsulfate
n-alkyl-dimethyl-(1-naphthylmethyl)-ammonium chloride (alkyl radical: 98% $C_{12}$, 2% $C_{14}$)
cetyl-dimethyl-benzyl-ammonium chloride
lauryl-dimethyl-benzyl-ammonium chloride or compounds of the following formulae:

A. 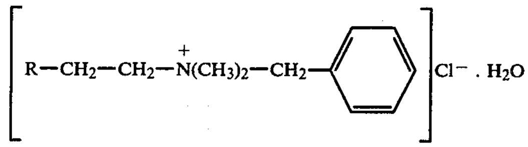

wherein R = 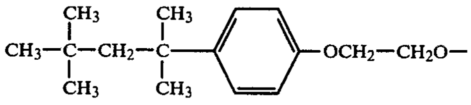

(p-diisobutylphenoxy-ethoxy-ethyl)-dimethyl-benzyl-ammonium chloride monohydrate B. 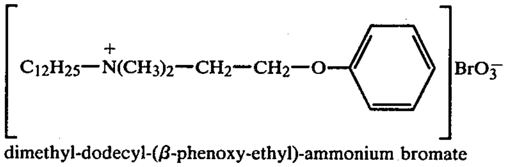

dimethyl-dodecyl-(β-phenoxy-ethyl)-ammonium bromate

C. 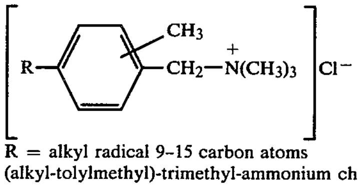

R = alkyl radical 9–15 carbon atoms
(alkyl-tolylmethyl)-trimethyl-ammonium chloride D. 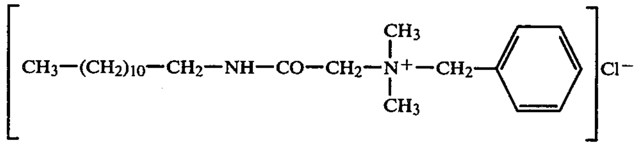

(dodecyl-carbamyl-methyl)-benzyl-dimethyl-ammonium chloride

E. 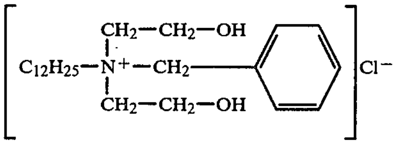

dodecyl-di-(β-hydroxyethyl)-benzyl-ammonium chloride

Finally, quaternary disinfecting ammonium compounds which are suitable are also those in which the alkyl groups are interrupted by nitrogen atoms which form further quaternary ammonium groups. Quaternary compounds of this group which may be especially mentioned are those compounds having the following formulae:

$$[(CH_3)_3\overset{+}{N}(CH_2)_6\overset{+}{N}(CH_3)_3]\ (OH)_2^-$$

$$[(CH_3)_3\overset{+}{N}(CH_2)_{12}\overset{+}{N}(CH_3)_3]\ (OH)_2^-$$

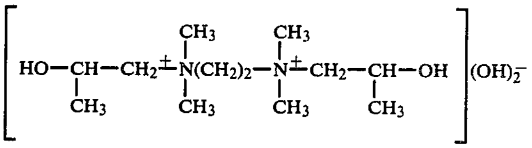

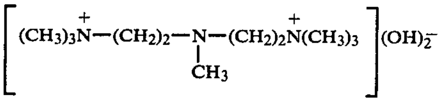

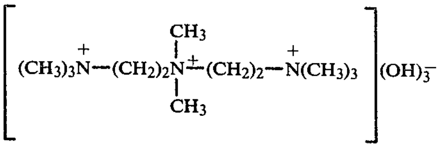

If desired, one or a plurality of the said quaternary ammonium compounds may be used. When the agents in accordance with the invention are used in aqueous solutions, concentrations of the quaternary ammonium compounds of from 0.01 gm/l to 1 gm/l, preferably 0.05 to 0.2 gm/l, are customarily employed.

In many cases, it is advantageous to add suitable complex formers or sequestering compounds in order to counteract the dependence of the efficacy of the quaternary ammonium compounds on the hardness of the water. Thus, suitable additives of this type are the alkali metal phosphates, particularly polymeric phosphates (tripolyphosphates) and phosphonic acids such as amino-(trimethylene phosphonic acid), hydroxyethane-1,1-diphosphonic acid, 2-phosphonobutane-1,2,4-tricarboxylic acid and ethylenediaminotetra-(methylene phosphonic acid). Aminopolycarboxylic acids such as nitrilotriacetic acid and ethylenediaminotetraacetic acid may also be used. Alternatively, the corresponding water-soluble alkali metal salts, particularly sodium and potassium salts, as well as the ammonium salt, may be used instead of the said acids.

The proportion of complex formers or sequestering agents of the above type in the disinfecting agents can vary to a considerable extent. In the case of alkaline products, suitable quantities of the additives lie between 0 and 55% by weight, preferably between 1% to 50% by weight based on the content of solid substances in the total composition. Quantities of less than 10%, preferably less than 5%, are generally used in the case of slightly alkaline, neutral, or even acid products.

The disinfecting agents can be acid, alkaline or neutral. Consequently, they can contain additives of acids, particularly phosphoric acid. Suitable additives in the case of alkaline adjusted disinfecting agents are NaOH, KOH, sodium carbonate, potassium carbonate and, if required, alkali metal silicates. The disinfecting agents can be manufactured in the form of solid products or liquid products. In the latter case, it may be advantageous to add solvents such as lower alcohols or alkylpolyglycol ethers.

The present invention will now be further described by means of the following Examples.

EXAMPLE 1

The tests were carried out as follows:

Test apparatus: foam-producing apparatus in accordance with Götte (DIN 53902).

Concentration and temperature of product: 0.5% in distilled water at 20° C.

Composition of product:

7.5% alkyl($C_{12}$–$C_{14}$)-dimethylbenzyl-ammonium chloride
1.0% isopropyl laurate (a)
30.0% phosphoric acid (100%)
2.0% alkylpolyglycol ether (solvent), preferably butoxyethoxyethanol
1.5% amino-(trimethylene phosphonic acid)
58.0% water Foam volume of the 0.5% solution of the product:
without ester additive: >900 ml
with ester additive: (a) 35 ml
for comparison when adding isopropyl decanoate ($C_{10}$) or isopropyl myristate ($C_{14}$) instead of isopropyl laurate ($C_{12}$), foam volumes of 120 or 200 ml were obtained.

EXAMPLE 2

The procedure was the same as that given in Example 1. However, the disinfectant had the following composition:

1.5% alkyl($C_{12}$–$C_{14}$)-dimethyl-dichlorobenzylammonium chloride
1.5% alkyl ($C_{12}$–$C_{14}$)-dimethyl-benzyl-ammonium chloride
3.0% pyrogenic silicic acid
30.0% sodium tripolyphosphate
50.0% soda (calc.)
12.0% sodium sulfate
2.0% ethyl laurate Foam values of the 0.5% solution of the product:
without ester additives: >900 ml
with ester additives: 25 ml

EXAMPLE 3

The procedure was the same as that given in Example 1. However, a liquid disinfectant of the following composition was used:

2.5% alkyl($C_{12}$–$C_{14}$)-dimethyl-benzyl-ammonium chloride
10.0% potassium tripolyphosphate
5.0% non-ionic wetting agent (tallow fatty alcohol adducted with 7.5 mols of ethylene oxide)
1.0% methyl laurate
10.0% ethyl alcohol
71.5% distilled water Foam values of the 0.1% solution of the product:
without ester additives: >900 ml
with ester additive: 50 ml

EXAMPLE 4

The procedure was the same as that given in Example 1. However, a neutral, liquid disinfectant of the following composition was used:

10.0% cetyl-trimethyl-ammonium chloride
20.0% laurylpyridinium chloride
30.0% ethyl alcohol
6.0% isopropyl laurate
34.0% distilled water Foam values of the 0.2% solution of the product:
without ester additive: >900 ml
with ester additive: 30 ml The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A low-foaming disinfecting agent composition for spraying or sprinkling applications consisting essentially of a disinfecting amount of a quaternary ammonium compound having the formula selected from the group consisting of

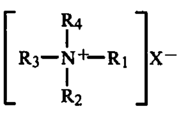
and
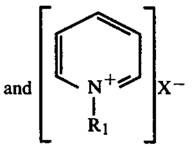

wherein $R_1$ is an organic group having 8 to 20 carbon atoms $R_2$ and $R_3$ are members selected from the group consisting of alkyl having 1 to 3 carbon atoms and alkylol having 2 to 3 carbon atoms, $R_4$ is a member selected from the group consisting of alkyl having from 1 to 12 carbon atoms and an aromatic hydrocarbon substituted alkyl having 1 to 12 carbon atoms in the alkyl, optionally substituted in the aromatic hydrocarbon ring with halogen, lower alkyl or lower alkoxy, and X is an anion, from 0.1% to 20% by weight, based on the solids weight of said composition of an alkyl laurate having from 1 to 4 carbon atoms in the alkyl, as a foam inhibitor, and from 0 to 55% by weight, based on the solids weight of said composition, of a sequestering compound counteracting the hardness components of water selected from the group consisting of an alkali metal polymeric phosphate, a phosphonic acid, an alkali metal salt or an ammonium salt of a phosphonic acid, an aminopolycarboxylic acid, and an alkali metal salt or an ammonium salt of an aminopolycarboxylic acid.

2. The disinfecting agent composition of claim 1 in the presence of a sufficient amount of an aqueous media to form a solution.

3. The disinfecting agent composition of claim 1 wherein said alkyl laurate is present in an amount of from 0.1% to 10% by weight.

4. The disinfecting agent composition of claim 1 wherein said sequestering compound is present in an amount of from 1% to 50% by weight.

5. The process of disinfecting solid substrates by the application of an aqueous disinfecting agent composition thereto by the spraying or sprinkling process, wherein said aqueous disinfecting agent composition contains from 0.01 gm to 1 gm per liter of said quaternary ammonium compound of claim 1.

6. The disinfecting agent composition of claim 1 wherein said alkyl laurate is isopropyl laurate and is present in an amount of from 0.1% to 10% by weight.

7. The disinfecting agent composition of claim 1 wherein said alkyl laurate is methyl laurate and is present in an amount of from 0.1% to 10% by weight.

8. The disinfecting agent composition of claim 1 wherein $R_1$ is an alkyl having 8 to 20 carbon atoms.

* * * * *